US012179357B2

(12) United States Patent
Mizobe et al.

(10) Patent No.: US 12,179,357 B2
(45) Date of Patent: Dec. 31, 2024

(54) METHOD OF SETTING FORCE CONTROL PARAMETER IN WORK OF ROBOT, ROBOT SYSTEM, AND COMPUTER PROGRAM

(71) Applicant: SEIKO EPSON CORPORATION, Tokyo (JP)

(72) Inventors: Kimitake Mizobe, Nagaokakyo (JP); Jun Toda, Shiojiri (JP); Takahisa Fukusen, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 250 days.

(21) Appl. No.: 17/850,046

(22) Filed: Jun. 27, 2022

(65) Prior Publication Data
US 2022/0410386 A1 Dec. 29, 2022

(30) Foreign Application Priority Data
Jun. 28, 2021 (JP) ................. 2021-106232

(51) Int. Cl.
*B25J 9/16* (2006.01)
(52) U.S. Cl.
CPC ............. *B25J 9/1633* (2013.01); *B25J 9/163* (2013.01); *B25J 9/1653* (2013.01)
(58) Field of Classification Search
CPC ........ B25J 9/1633; B25J 9/163; B25J 9/1653; B25J 9/1628; B25J 9/1687; B25J 11/007; B25J 13/085; G05B 2219/40301; G05B 2219/40586; G05B 13/024; G05B 13/042; G05B 2219/41435; G05B 2219/39332; G05B 2219/34455
See application file for complete search history.

(56) References Cited

U.S. PATENT DOCUMENTS

| | | | |
|---|---|---|---|
| 9,723,144 B1* | 8/2017 | Gao | H04M 3/5238 |
| 11,205,124 B1* | 12/2021 | Yang | B61L 25/023 |
| 2011/0093120 A1* | 4/2011 | Ando | B25J 9/1638 |
| | | | 700/260 |
| 2019/0314996 A1* | 10/2019 | Otsuki | G06N 3/04 |
| 2020/0101603 A1 | 4/2020 | Satou | |
| 2020/0164514 A1* | 5/2020 | Kaneko | B25J 9/1633 |
| 2021/0370507 A1* | 12/2021 | Corcodel | B25J 9/1664 |
| 2022/0219320 A1* | 7/2022 | Søe-Knudsen | B25J 9/1666 |

FOREIGN PATENT DOCUMENTS

JP 2020-055095 A 4/2020

* cited by examiner

*Primary Examiner* — Bhavesh V Amin
*Assistant Examiner* — Esvinder Singh
(74) *Attorney, Agent, or Firm* — Harness, Dickey & Pierce, P.L.C.

(57) ABSTRACT

A method of the present disclosure includes (a) setting a limit value specifying a constraint condition with respect to a specific force control characteristic value detected in force control and an objective function with respect to a specific evaluation item relating to the work, (b) searching for an optimal value of the force control parameter using the objective function, and (c) determining a setting value of the force control parameter according to a result of the searching. The objective function has a form in which a penalty increasing according to an exceedance of the force control characteristic value from an allowable value smaller than the limit value is added to an actual measurement value of the evaluation item.

9 Claims, 9 Drawing Sheets

METHOD OF SETTING FORCE CONTROL PARAMETER IN WORK OF ROBOT, ROBOT SYSTEM, AND COMPUTER PROGRAM

The present application is based on, and claims priority from JP Application Serial Number 2021-106232, filed Jun. 28, 2021, the disclosure of which is hereby incorporated by reference herein in its entirety.

BACKGROUND

1. Technical Field

The present disclosure relates to a method of setting a force control parameter in work of a robot, a robot system, and a computer program.

2. Related Art

JP-A-2020-55095 discloses a system that adjusts a parameter of a robot. Specifically, first, the system generates force data and control command adjustment data on a manipulator as state data and generates determination data representing a determination result of a motion state of the manipulator after the adjustment action. Further, the system generates a learning model of reinforcement learning of the adjustment action of the control command for a state of a force applied to the manipulator using the state data and the determination data.

In the related art, as rewards for learning of a model, a good reward is given when the applied load falls within a predetermined setting range and a bad reward is given when not. However, for a trial using a real robot, sensor output varies due to sensor noise, shapes of workpieces, position variations, or the like. Accordingly, there is a problem that, even if learning may be performed, the possibility that the load is beyond the setting range may be higher depending on the variations of the sensor output. Therefore, a method of setting a parameter to an appropriate value even when the sensor output varies is desired.

SUMMARY

According to a first aspect of the present disclosure, a method of setting a force control parameter in work of a robot is provided. The method includes (a) setting a limit value specifying a constraint condition with respect to a specific force control characteristic value detected in force control and an objective function with respect to a specific evaluation item relating to the work, (b) searching for an optimal value of the force control parameter using the objective function, and (c) determining a setting value of the force control parameter according to a result of the searching. The objective function has a form in which a penalty increasing according to an exceedance of the force control characteristic value from an allowable value smaller than the limit value is added to an actual measurement value of the evaluation item.

According to a second aspect of the present disclosure, a robot system is provided. The robot system includes a robot, a sensor detecting a specific force control characteristic value in work of the robot by force control, and a parmeter setting section executing processing of setting a force control parameter of the robot. The parameter setting section executes (a) processing of setting a limit value specifying a constraint condition with respect to the force control characteristic value and an objective function with respect to a specific evaluation item relating to the work, (b) processing of searching for an optimal value of the force control parameter using the objective function, and (c) processing of determining a setting value of the force control parameter according to a result of the searching. The objective function has a form in which a penalty increasing according to an exceedance of the force control characteristic value from an allowable value smaller than the limit value is added to an actual measurement value of the evaluation item.

According to a third aspect of the present disclosure, a non-transitory computer-readable storage medium storing a computer program controlling a processor to execute processing of setting a force control parameter in work of a robot is provided. The computer program controls the processor to execute (a) processing of setting a limit value specifying a constraint condition with respect to a specific force control characteristic value detected in force control and an objective function with respect to a specific evaluation item relating to the work, (b) processing of searching for an optimal value of the force control parameter using the objective function, and (c) processing of determining a setting value of the force control parameter according to a result of the searching. The objective function has a form in which a penalty increasing according to an exceedance of the force control characteristic value from an allowable value smaller than the limit value is added to an actual measurement value of the evaluation item.

DESCRIPTION OF EXEMPLARY EMBODIMENTS

A. First Embodiment

Figure 1:
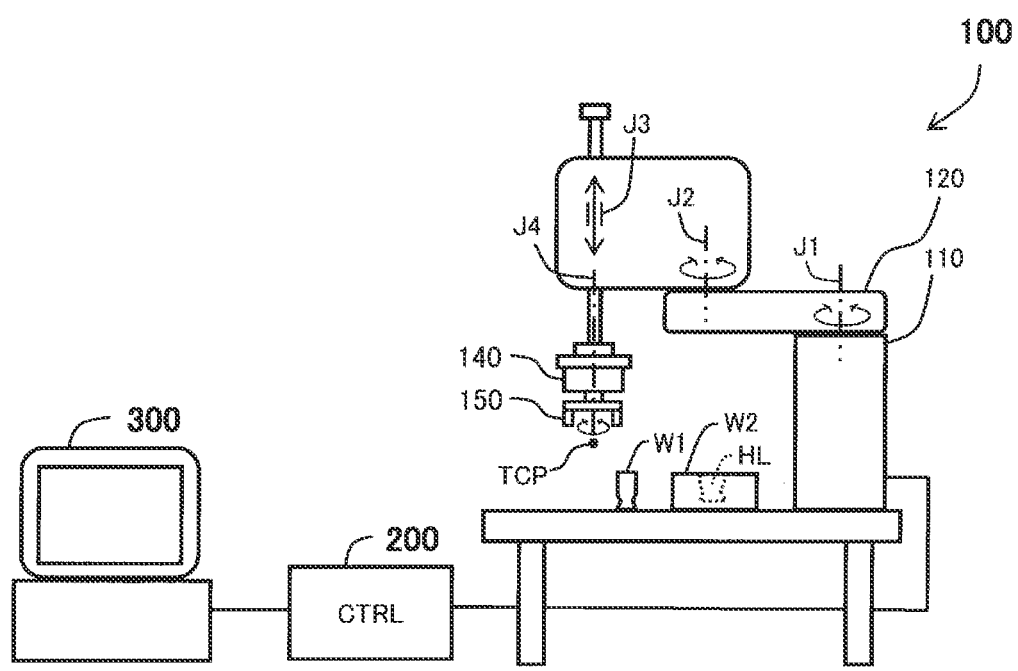
FIG. 1 is an explanatory diagram showing a configuration of a robot system in embodiments.

FIG. 1 is an explanatory diagram showing an example of a robot control system in embodiments. The robot control system includes a robot 100, a control apparatus 200 controlling the robot 100, and an information processing apparatus 300. The robot 100 is installed on a platform. The information processing apparatus 300 is e.g. a personal computer.

The robot 100 includes a base 110 and a robot arm 120. The robot arm 120 is sequentially coupled by four joints J1 to J4. A force sensor 140 and an end effector 150 are attached to the distal end portion of the robot arm 120. A TCP (Tool Center Point) as a control point of the robot 100 is set near the distal end of the robot arm 120. In the embodiment, a four-axis robot having the four joints J1 to J4 is exemplified, however, a robot having any arm mechanism having a plurality of joints can be used. The robot 100 of the embodiment is a horizontal articulated robot, however, a vertical articulated robot may be used.

The force sensor 140 is a sensor detecting a force applied to the end effector 150. As the force sensor 140, a load cell that can detect a force in a single axial direction and a force sensor and a torque sensor that can detect force components in a plurality of axial directions can be used. In the embodiment, a six-axis force sensor is used as the force sensor 140. The six-axis force sensor detects magnitude of forces parallel to three detection axes orthogonal to one another and magnitude of torque around the three detection axes in an intrinsic sensor coordinate system. Note that the force sensor 140 may be provided in another position than the end effector 150, e.g. one or more joints of the joints J1 to J4.

In the embodiment, the robot 100 fits a first workpiece W1 into a hole HL of a second workpiece W2, and thereby, executes work to assemble the two workpieces W1, W2. In the work, force control using a force detected by the force sensor 140 is executed.

Figure 2:
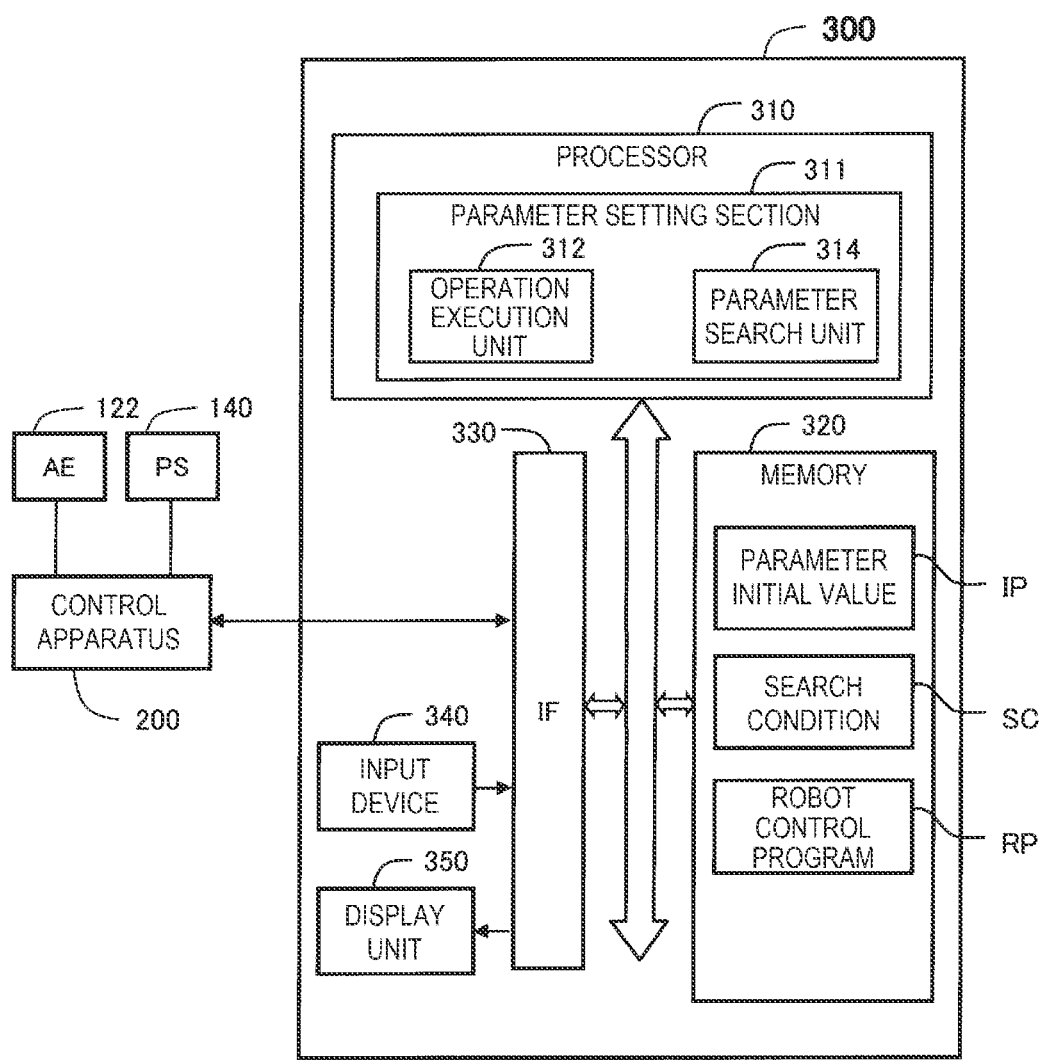
FIG. 2 is a functional block diagram of an information processing apparatus in a first embodiment.

FIG. 2 is a block diagram showing functions of the information processing apparatus 300 in the first embodiment. The information processing apparatus 300 can be realized as an information processing apparatus e.g. a personal computer. The information processing apparatus 300 has a processor 310, a memory 320, an interface circuit 330, and an input device 340 and a display unit 350 coupled to the interface circuit 330. The control apparatus 200 is further coupled to the interface circuit 330. Measurement values of an arm encoder 122 and the force sensor 140 of the robot 100 are input to the interface circuit 330 via the control apparatus 200. The arm encoder 122 is a position sensor measuring positions or displacement in the plurality of joints of the robot arm 120.

The processor 310 has a function as a parameter setting section 311 setting a force control parameter of the robot 100. The parameter setting section 311 includes functions of an operation execution unit 312 and a parameter search unit 314. The operation execution unit 312 controls the robot 100 to execute work according to a robot control program. The parameter search unit 314 executes processing of searching for the force control parameter of the robot 100. The function of the parameter setting section 311 is realized by the processor 310 executing a computer program stored in the memory 320. Note that part or all of the functions of the parameter setting section 311 may be realized by a hardware circuit.

In the memory 320, a parameter initial value IP, a search condition SC, and a robot control program RP are stored. The parameter initial value IP is an initial value of the force control parameter. The search condition SC is a condition for search processing of the force control parameter. The robot control program RP includes a plurality of commands for moving the robot 100.

Figure 3:
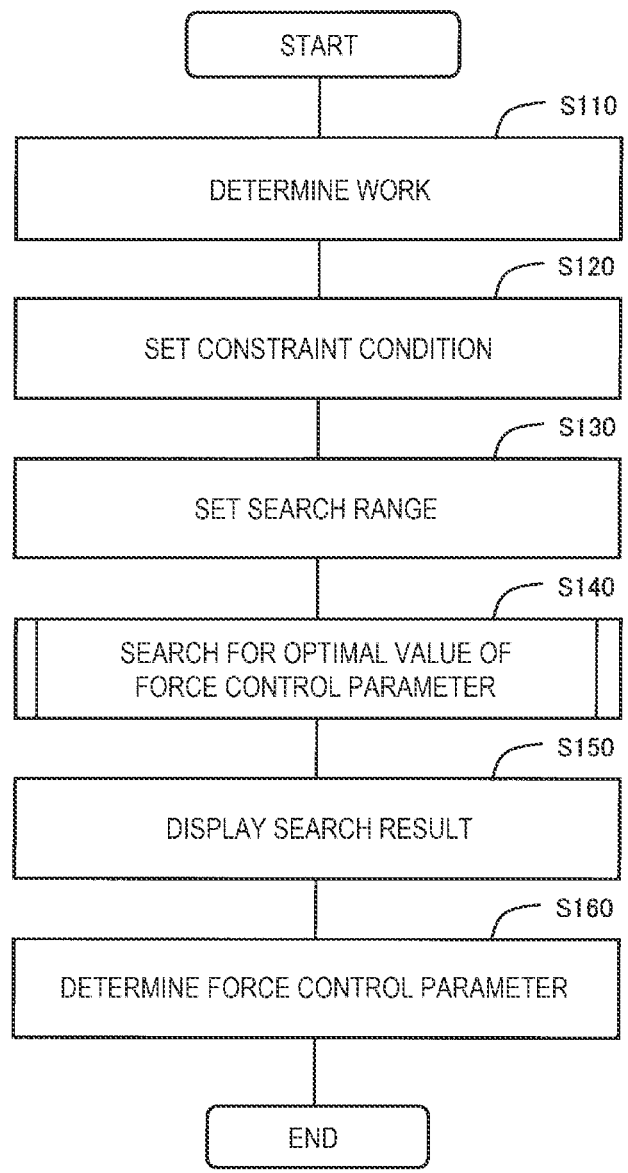
FIG. 3 is a flowchart showing a procedure of setting processing of a force control parameter.

FIG. 3 is a flowchart showing a procedure of setting processing of the force control parameter. At step S110, a worker determines work for which a force control parameter is set. In the embodiment, as the work, fitting work of two workpieces W1, W2 shown in FIG. 1 is selected. The robot control program RP is a program describing the motion of the work. When a plurality of robot control programs describing various kinds of work are created in advance, at step S110, one of the programs is selected by the worker. When the robot control program is not yet created, the robot control program is created at step S110.

At step S120, the worker sets a constraint condition for searching for an optimal value of the force control parameter and, at step S130, sets a search range for searching for the optimal value of the force control parameter. As the constraint condition, conditions on various force control characteristic values e.g. the maximum value of a resultant force or resultant moment calculated from the measurement values of the force sensor 140, the maximum value of the load of an arm motor, the maximum value of vibration may be used. "Force control characteristic value" refers to a value detected in force control. When the maximum value of vibration is used as the constraint condition, a vibration sensor for detecting vibration as the force control characteristic value is provided in the hand of the robot 100 or the plat form. In the embodiment, a resultant force is used as the force control characteristic value specifying the constraint condition. This will be further described later.

As the force control parameter to be optimized, e.g. one or more of a virtual mass coefficient, a virtual viscosity coefficient, and a virtual elastic coefficient in impedance control may be selected. Or, these are expressed in a form of a function of a parameter $\alpha$, that is, by the virtual mass coefficient=$M(\alpha)$, the virtual viscosity coefficient=$B(\alpha)$, the virtual elastic coefficient=$K(\alpha)$, and the parameter $\alpha$ may be optimized. Or, another item than these can be optimized. As the force control method, not limited to the impedance control, but force control based on position control such as rigidity control or damping control or force control based on torque control such as Active Stiffness Control can be used. For the control, different force control parameters are respectively used.

At step S140, the parameter search unit 314 searches for the optimal value of the force control parameter according to the set constraint condition and search range.

Figure 4:
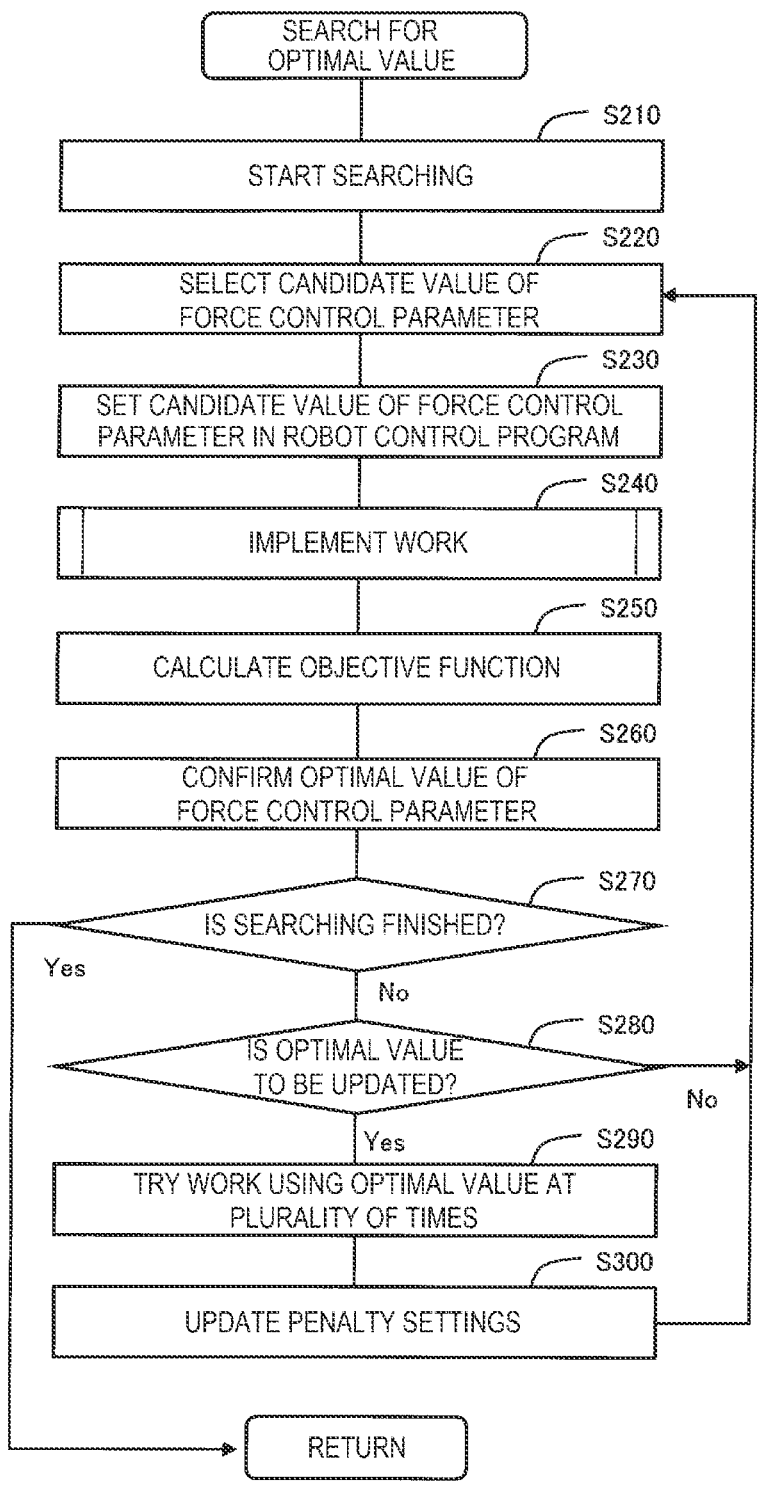
FIG. 4 is a flowchart showing a detailed procedure of optimal value search processing in the first embodiment.

FIG. 4 is a flowchart showing a detailed procedure of the optimal value search processing at step S140. When searching is started at step S210, at step S220, the parameter search unit 314 searches for a candidate value of the force control parameter. The searching is executed using an optimization algorithm e.g. CMA-ES (Covariance Matrix Adaptation Evaluation Strategy). An objective function used in the optimization algorithm will be described later. Note that, when step S220 is first executed, a preset initial value is used as the candidate value of the force control parameter.

At step S230, the parameter search unit 314 sets the candidate value of the force control parameter selected at step S220 in the robot control program RP. At step S240, the operation execution unit 312 performs work of the robot 100 according to the robot control program RP. During the work, measurement values of the sensors including the force sensor 140 are acquired.

Figure 5:
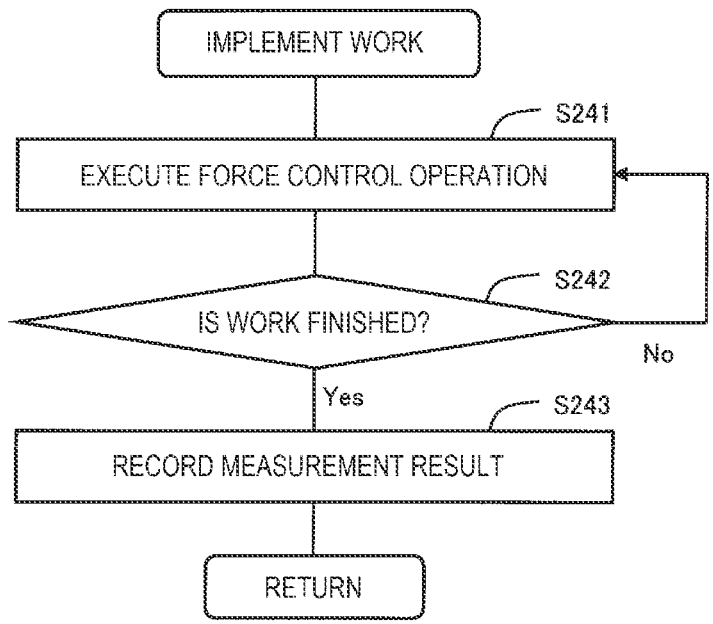
FIG. 5 is a flowchart showing a detailed procedure of implementation of work in the first embodiment.

FIG. 5 is a flowchart showing a detailed procedure of implementation of work at step S240. At step S241, the operation execution unit 312 executes work including force control operation. This work is continued until the work is determined as being finished at step S242. When the work is finished, at step S243, a measurement result containing the measurement values of the sensors and a takt time of the work is recorded.

At step S250 in FIG. 4, the parameter search unit 314 calculates a value of the objective function in the optimization processing from the measurement result obtained during the work. In the embodiment, as the objective function, e.g. the following function is used.

$$y = t + G(f_{peak}) \quad (1)$$

$$G(f_{peak}) = 0 \quad (\text{when } f_{peak} \leq F_1) \quad (2a)$$

$$G(f_{peak}) = \theta_1(f_{peak} - F_1) \quad (\text{when } F_1 < f_{peak} \leq F_2) \quad (2b)$$

$$G(f_{peak}) = \theta_1(f_{peak} - F_1) + \theta_2(f_{peak} - F_2) \quad (\text{when } f_{peak} > F_2) \quad (2c)$$

Here, y is the objective function, t is the takt time as an evaluation item of work, is the maximum $f_{peak}$ is the maximum value of a resultant force of the forces measured during the work, $G(f_{peak})$ is a penalty by the maximum resultant force $f_{peak}$, $F_1$ is an allowable value as a first threshold of the maximum resultant force $f_{peak}$, $F_2$ is a limit value as a second threshold of the maximum resultant force $f_{peak}$, and $\theta_1$, $\theta_2$ are coefficients showing increase rates of the penalty. The takt time t is measured by a timer of the robot system.

In the objective function y, the takt time t is used as the evaluation item of the work, however, another evaluation item than the takt time t may be used. For example, the number of times of work per unit time, differences of the real position and attitude relative to target position and attitude at the terminal end, or the like may be used as the evaluation item.

The maximum resultant force $f_{peak}$ is a force evaluation value for which the constraint condition is set at step S120 and, of the resultant forces of the forces in the three axial directions measured by the force sensor 140, the maximum value measured during the work. As the force evaluation value for which the constraint condition is set, another force evaluation value as the maximum value of the resultant moment may be used.

The allowable value $F_1$ and the limit value $F_2$ are respectively set as the following values.

Limit Value $F_2$

The limit value $F_2$ is a value specifying the upper limit of the maximum resultant force $f_{peak}$ as the constraint condition. The limit value $F_2$ is e.g. a threshold that can break the workpiece W1. The limit value $F_2$ is designated by a user according to a condition of the material of the workpiece W1 or the like.

Allowable Value $F_1$

The allowable value $F_1$ is a value set in advance as a smaller value than the limit value $F_2$. Specifically, it is preferable to set the allowable value $F_1$, in consideration of measurement variations of the maximum resultant force $f_{peak}$ as the force evaluation value, as a value by subtraction of a quantity obtained by quantification of the measurement variations from the limit value $F_2$. The difference between the values $(F_2 - F_1)$ may be e.g. a value obtained by multiplication of the standard deviation of the maximum resultant force $f_{peak}$ by a coefficient of about 1 to 3. Generally, it is preferable to set the difference between the allowable value $F_1$ and the limit value $F_2$ relative to the force evaluation value to a value having a positive correlation with the standard deviation of the force evaluation value.

Figure 6:
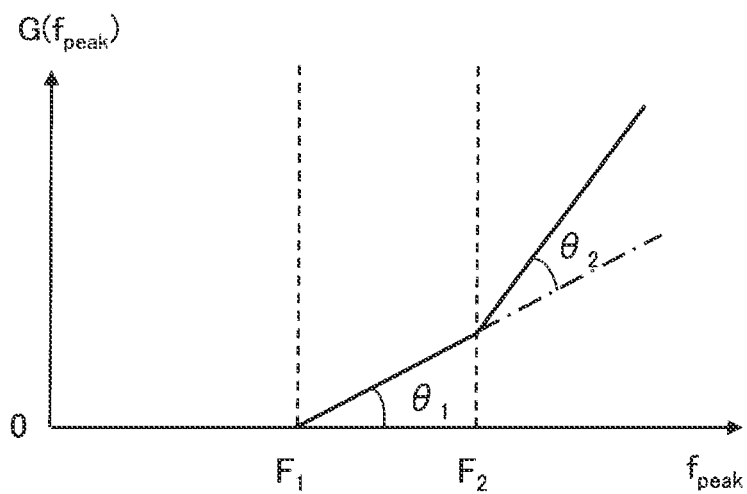
FIG. 6 is a graph showing a shape of a penalty contained in an objective function for optimization.

FIG. 6 is a graph showing a shape of the penalty $G(f_{peak})$ of the objective function y. When the maximum resultant force $f_{peak}$ is equal to or smaller than the allowable value $F_1$, the penalty G is zero and, when the force is larger than the allowable value $F_1$, the penalty increases at the first increase rate $\theta_1$ according to an exceedance $(f_{peak} - F_1)$ thereof. Further, when the maximum resultant force $f_{peak}$ is larger than the limit value $F_2$, a component increasing at the second increase rate $\theta_2$ according to an exceedance $(f_{peak} - F_2)$ thereof is further added to the penalty G. That is, the penalty G when the maximum resultant force $f_{peak}$ is larger than the limit value $F_2$ is a sum of the first term and the second term on the right side of (2c). The first term $\theta_1(f_{peak} - F_1)$ on the right side of (2c) is referred to as "first penalty component" and the second term $\theta_2(f_{peak} - F_2)$ on the right side is referred to as "second penalty component".

As described above, the penalty G of the objective function y when the maximum resultant force $f_{peak}$ is larger than the limit value $F_2$ contains the first penalty component $\theta_1(f_{peak} - F_1)$ and the second penalty component $\theta_2(f_{peak} - F_2)$. Thereby, the larger penalty G may be given if the maximum resultant force $f_{peak}$ is larger than the limit value $F_2$, and the possibility that the maximum resultant force $f_{peak}$ is larger than the limit value $F_2$ may be reduced.

Note that, as the objective function y, a function expressed in another form than that of the above described expression may be used. For example, the penalty G of the objective function y when the maximum resultant force $f_{peak}$ is larger than the limit value $F_2$ may be only the first penalty component $\theta_1(f_{peak} - F_1)$. Also, in this case, the objective function y has a form in which the penalty G increasing according to the exceedance of the maximum resultant force $f_{peak}$ from the allowable value $F_1$ smaller than the limit value $F_2$ specified in the constrain condition is added to the actual measurement value of the takt time t as the evaluation item in common with the above described objective function. Using the objective function has an advantage that the force control parameter may be optimized while the possibility that the force is larger than the limit value $F_2$ as the constraint condition is reduced. Further, even when the force sensor 140 has output variations, the possibility that the maximum resultant force $f_{peak}$ as the force control characteristic value is larger than the limit value $F_2$ as the constraint condition may be reduced. In another example, the first penalty component and the second penalty component may be respective functions increasing curvilinearly.

At step S260 in FIG. 4, the parameter search unit 314 confirms the optimal value of the force control parameter according to the value of the objective function y. That is, when the value of the objective function y is the minimum value of the previous values, this candidate value is updated as a new optimal value. On the other hand, when the value of the objective function y is not the minimum value of the previous values, the previous optimal value is maintained without change.

At step S270, the parameter search unit 314 determines whether or not a search end condition is fulfilled. As the search end condition, e.g. a condition that the takt time t of the work reaches a preset target value may be used. Or, when a better solution is not found in the latest searching at a preset number of times, e.g. the latest twenty times of searching, fulfillment of the search end condition can be determined.

At step S280, the parameter search unit 314 determines whether or not the optimal value of the force control parameter is updated and, when the optimal value is not updated, the process returns to step S220. On the other hand, when the optimal value of the force control parameter is updated, the process goes to step S290.

At step S290, the operation execution unit 312 tries work by the robot 100 at a plurality of times using the updated optimal value of the force control parameter and collects the force control characteristic values relating to the objective function y. In the embodiment, measurement values of the maximum resultant force $f_{peak}$ are collected as the force control characteristic values.

At step S300, the parameter search unit 314 updates the penalty settings in the objective function y. This update may be performed in the following manner, for example. In the following description, N is the number of trials of work at step S290 and an integer equal to or more than 2.

Update of Allowable Value $F_1$

It is preferable to update the allowable value $F_1$ according to the following expression.

$$F_1 = F_2 - k_1 \times \sigma \qquad (3)$$

Here, $\sigma$ is a standard deviation of the maximum resultant force $f_{peak}$ in the N trials, and $k_1$ is a coefficient. The coefficient $k_1$ is a positive real number and set to e.g. a value in a range from 1 to 3.

For example, on the assumption that the variation has a normal distribution, when an average value of the measured maximum resultant forces $f_{peak}$ is almost equal to the allowable value, the allowable value $F_1$ for $k_1=3$ is a value that may suppress the possibility that the maximum resultant force $f_{peak}$ is larger than the limit value $F_2$ to 0.15% or less even in consideration of the variation. When the possibility that the maximum resultant force $f_{peak}$ is larger than the limit value $F_2$ is slightly higher, but allowable, the coefficient $k_1$ may be set to a value in a range of $1 < k_1 \leq 3$. Note that the limit value $F_2$ is given as the constraint condition, and preferably not to be updated.

The second term $k_1 \times \sigma$ on the right side of the above described expression (3) is a difference between the allowable value $F_1$ and the limit value $F_2$ with respect to the maximum resultant force $f_{peak}$ and equal to multiplication of the standard deviation $\sigma$ of the maximum resultant force $f_{peak}$ by the coefficient $k_1$. Generally, it is preferable to set the difference between the allowable value $F_1$ and the limit value $F_2$ with respect to the force control characteristic value to be equal to a difference value having a positive correlation with the standard deviation $\sigma$ of the force control characteristic value. In this manner, an appropriate allowable value $F_1$ may be set according to the variation of the force control characteristic value.

Note that, when single work at step S290 includes a plurality of work portions, the work portion having a high possibility that the maximum resultant force $f_{peak}$ is the maximum may be recorded, and the variation of the maximum resultant force $f_{peak}$ may be calculated by repetition of only part of work containing the work portion having the high possibility that the maximum resultant force $f_{peak}$ is the maximum. For example, the work to fit the first workpiece W1 in the second workpiece W2 in FIG. 1 may be divided into the following work portions:

(1) move the end effector 150 to above the first workpiece W1, and then, move the end effector downward to the position of the first workpiece W1;
(2) grip the first workpiece W1 by the end effector 150;
(3) move the gripped first workpiece W1 to above the second workpiece W2, and then, move the first workpiece downward to immediately above the second workpiece W2;
(4) fit the first workpiece W1 in the second workpiece W2; and
(5) release the first workpiece W1 and move the end effector 150 to above.

In this case, the variation of the maximum resultant force $f_{peak}$ may be calculated by repetition of part of work containing the work portion (4) to fit the first workpiece W1 in the second workpiece W2. In this manner, the time taken to repeat the trials at step S290 can be reduced.

Update of First Increase Rate $\theta_1$

It is preferable to update the first increase rate $\theta_1$ in the following manner by comparison between an average value $f_N$ of the maximum resultant forces $f_{peak}$ in the N trials and the allowable value $F_1$.

(a) when $f_N \geq F_1 + m_1$, increase $\theta_1$ with $\theta_1 = \theta_1 + a$
(b) when $f_N \leq F_1 - m_2$, decrease $\theta_1$ with $\theta_1 = \theta_1 - a$ Here, $m_1$, $m_2$ are margins as to whether or not the average value $f_N$ of the maximum resultant forces $f_{peak}$ is substantially within the same range as the allowable value $F_1$, and a is a constant for increasing and decreasing the first increase rate $\theta_1$. All of $m_1$, $m_2$, a are positive real numbers. The margin $m_1$ is also referred to as "first determination value" and the margin $m_2$ is also referred to as "second determination value". Note that $m_1$ and $m_2$ may be equal.

On the assumption that the maximum resultant forces $f_{peak}$ at the N trials have a normal distribution, values according to the variation and the standard deviation thereof may be set as the margins $m_1$, $m_2$. It is desirable that the average value $f_N$ of the maximum resultant forces $f_{peak}$ is around the allowable value $F_1$ of the maximum resultant force $f_{peak}$, however, when the values are too much separated, in the above described manner, the first increase rate $\theta_1$ of the penalty is adjusted, and thereby, the average value $f_N$ of the maximum resultant forces $f_{peak}$ may fall within a range close to the allowable value $F_1$.

As described above, it is preferable to increase the first increase rate $\theta_1$ when the average value $f_N$ of the force control characteristic values is larger by the first determination value $m_1$ or more than the allowable value $F_1$ and decrease the first increase rate $\theta_1$ when the average value $f_N$ is smaller by the second determination value $m_2$ or more than the allowable value $F_1$. In this manner, there is an advantage that the first increase rate $\theta_1$ may be adjusted so that the force control characteristic values measured during the work may fall within a range close to the allowable value F1.

Update of Second Increase Rate $\theta_2$

It is preferable to update the second increase rate $\theta_2$ in the following manner according to an excess rate $P = n/N$ as a rate of the number of times n of trials at which the maximum resultant force $f_{peak}$ is larger than the limit value $F_2$ of the N trials.

(a) when $P_1 \leq P$, increase $\theta_2$ with $\theta_2 = \theta_2 + b$
(b) when $P \leq P_2$, decrease $\theta_2$ with $\theta_2 = \theta_2 - b$ Here, $P_1$, $P_2$ are determination values, $P_2 < P_1$, and b is a constant for increasing and decreasing the second increase rate $\theta_2$. All of $P_1$, $P_2$, b are positive real numbers.

It is preferable to increase the second increase rate $\theta_2$ when the excess rate P is equal to or larger than a first determination rate $P_1$, and decrease the second increase rate $\theta_2$ when the excess rate P is equal to or smaller than a second determination rate $P_2$ smaller than the first determination rate $P_1$. The second increase rate $\theta_2$ is updated in the above described manner, and thereby, the possibility that the maximum resultant force $f_{peak}$ is larger than the limit value $F_2$ may be further reduced in the optimization process.

Part of the above described update of the allowable value $F_1$, update of the first increase rate $\theta_1$, and update of the second increase rate $\theta_2$ is not necessarily executed. Or, update of the penalty settings is not necessarily performed by omission of steps S290, S300.

The update of the penalty settings at step S290 may not be executed until a preset times of searching is performed, but executed only when the optimal value of the force control parameter is updated afterwards. This is because, in the initial several times of searching, the possibility that the optimal value of the force control parameter at the time is the final optimal value is low, and, when the update of the penalty settings is limited after a constant number of times of searching is performed, the number of trials of work at step S290 may be reduced in a range having a smaller impact on the final optimal value.

Further, when a generation-based algorithm such as CMA-ES is used, whether or not the optimal value of the force control parameter is updated may be checked with respect to each generation and the penalty settings may be updated. In this manner, when the optimal value is successively updated within the same generation, overlapping trials of work may be prevented.

When the update of penalty settings at step S300 ends, the process returns to step S220 and the above described processing is repeated again. Note that the selection of a new candidate value at step S220 is executed according to the optimization algorithm using the objective function y and the history of the candidate values.

In the above described manner, when the searching of the optimal value of the force control parameter ends, the process goes to step S150 in FIG. 3, and a search result is displayed on the display unit 350. At step S160, the worker determines the force control parameter with reference to the search result. Specifically, for example, the worker may employ the optimal value of the force control parameter obtained by searching as the final force control parameter without change. Or, when there is a candidate value not the optimal value, but just slightly deviating from the constraint condition and having the takt time as the main evaluation item better than the optimal value, the worker may employ the candidate value. To enable the selection, it is preferable to display a plurality of candidate values including the optimal value of the force control parameter in a list form respectively containing the values of the evaluation item such as the takt time and the force control characteristic values such as the maximum resultant force $f_{peak}$ as the search result.

As described above, in the first embodiment, as the objective function used for optimization of the force control parameter, the objective function in the form in which the penalty increasing according to the exceedance of the specific force control characteristic value from the allowable value is added to the actual measurement value of the evaluation item is used, and the force control parameter may be optimized while the possibility that the value is larger than the limit value as the constraint condition may be reduced. Further, even when the force sensor has output variations, the possibility that the force control characteristic value is larger than the limit value as the constraint condition may be reduced.

B. Second Embodiment

Figure 7:
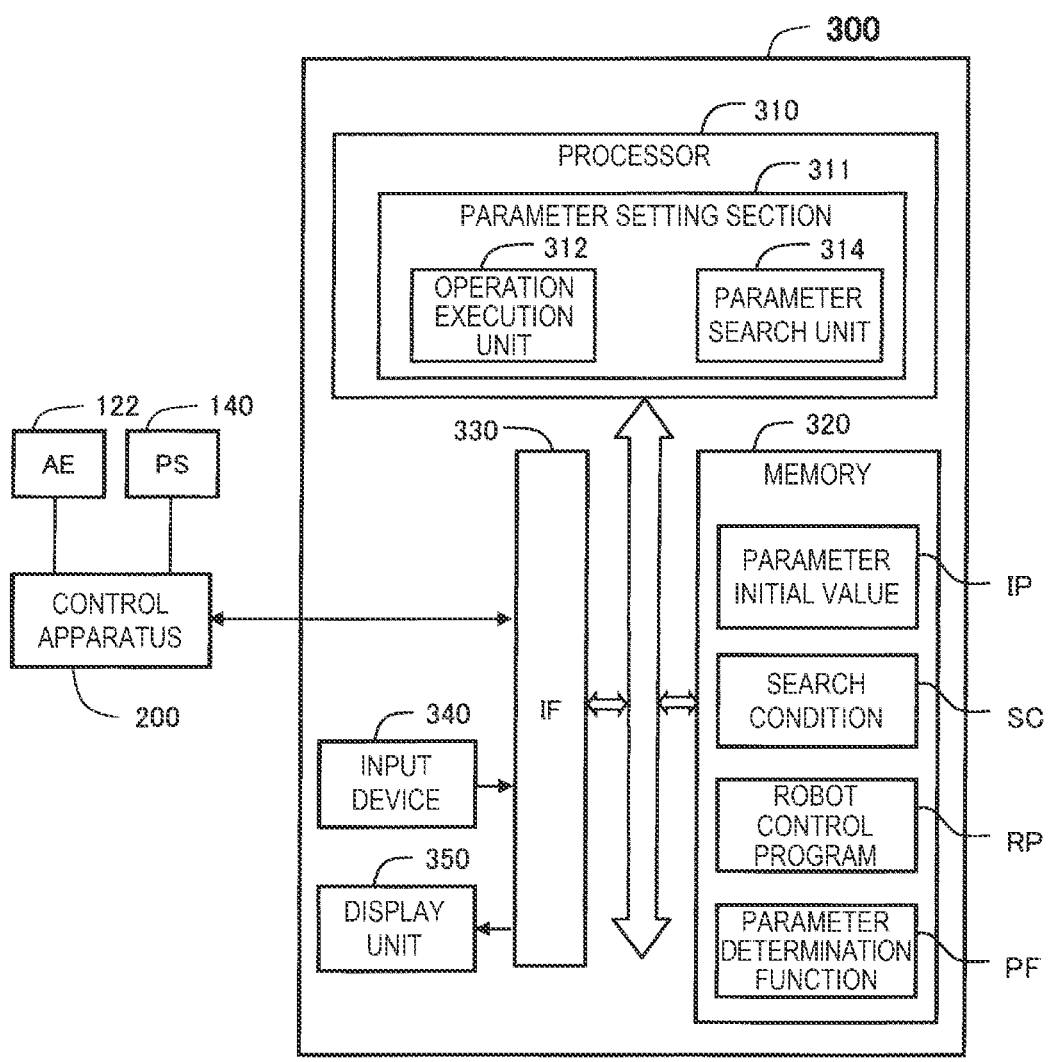
FIG. 7 is a functional block diagram of an information processing apparatus in a second embodiment.

FIG. 7 is a block diagram showing functions of the information processing apparatus 300 in a second embodiment. A difference from the first embodiment shown in FIG. 2 is only in that a parameter determination function PF is stored in the memory 320 of the information processing apparatus 300 in the second embodiment, and the other configurations are substantially the same as those of the first embodiment. Further, the configuration of the entire robot system is the same as that shown in FIG. 1. The parameter determination function PF is a function of determining the force control parameter according to the state of the robot 100 including the hand position and the speed of the robot 100.

Figure 8:
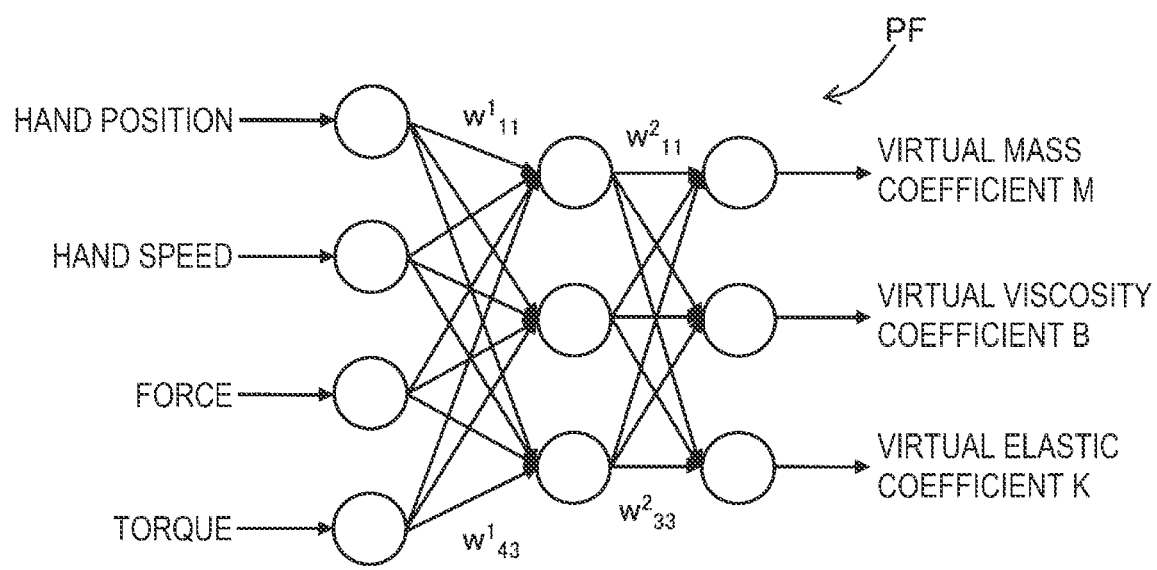
FIG. 8 is an explanatory diagram showing a configuration example of a parameter determination function.

FIG. 8 is an explanatory diagram showing a configuration example of the parameter determination function PF. The parameter determination function PF is configured as a neural network having a three-layer structure. Input of the neural network is a value showing a state of the robot 100. In the example of FIG. 8, the hand position, the hand speed, the force, and the torque are used as input. "Hand position" refers to the position and the attitude of the control point TCP shown in FIG. 1, and "hand speed" refers to a speed of the control point TCP. "Force" and "torque" are values measured by the force sensor 140. Input to the parameter determination function PF is also referred to as "state observation value". Output of the parameter determination function PF is the virtual mass coefficient M, the virtual viscosity coefficient B, and the virtual elastic coefficient K. Note that, as the input and the output, other items than those may be used. Further, the number of neuron layers is not limited to three, but may be four or more. Furthermore, the parameter determination function PF may be realized by another configuration than the neural network.

As is well known, calculation in the respective nodes of the neural network is weighted addition using a weight $w^L_{ij}$. Here, L is an ordinal number showing the order of the layer, i is an ordinal number showing the order of the node of the lower layer, and j is an ordinal number showing the order of the node of the upper layer. A row in which all weights $w^L_{ij}$ within the parameter determination function PF are sequentially arranged is defined as a weight vector $W=(w^1_{11}, w^1_{12}, \ldots, w^2_{33})$. In the second embodiment, the parameter search unit 314 executes the optimization with the weight vector W as a search object using the optimization algorithm. In the following description, the weight vector W is referred to as "internal parameter W".

Figure 9:
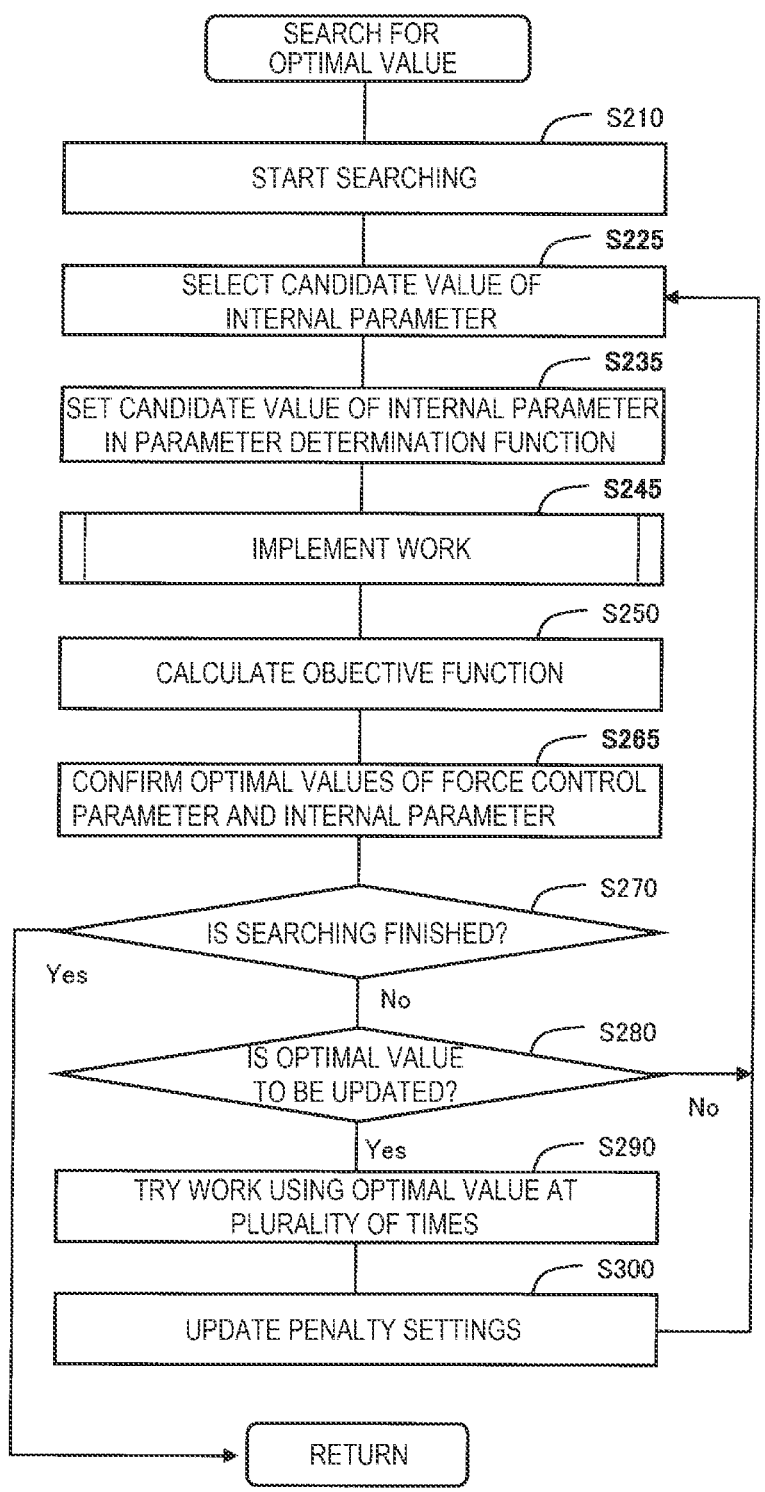
FIG. 9 is a flowchart showing a detailed procedure of optimal value search processing in the second embodiment.

FIG. 9 is a flowchart showing a detailed procedure of optimal value search processing in the second embodiment. A difference from the procedure of the first embodiment shown in FIG. 4 is only in that steps S220, S230, S240, S260 in FIG. 4 are replaced by steps S225, S235, S245, S265, and the other steps are substantially the same as those of the first embodiment. Further, the procedure of the entire setting processing of the force control parameter shown in FIG. 3 are the same as that of the first embodiment.

When searching is started at step S210, at step S225, the parameter search unit 314 searches for a candidate value of the internal parameter W of the parameter determination function PF. The searching is also executed using the optimization algorithm such as CMA-ES. Note that, when step S225 is first executed, a preset initial value is used as the candidate value of the internal parameter W.

At step S235, the parameter search unit 314 sets the candidate value of the internal parameter W selected at step S225 in the parameter determination function PF. At step S245, the operation execution unit 312 implements work of the robot 100 according to the robot control program RP.

Figure 10:
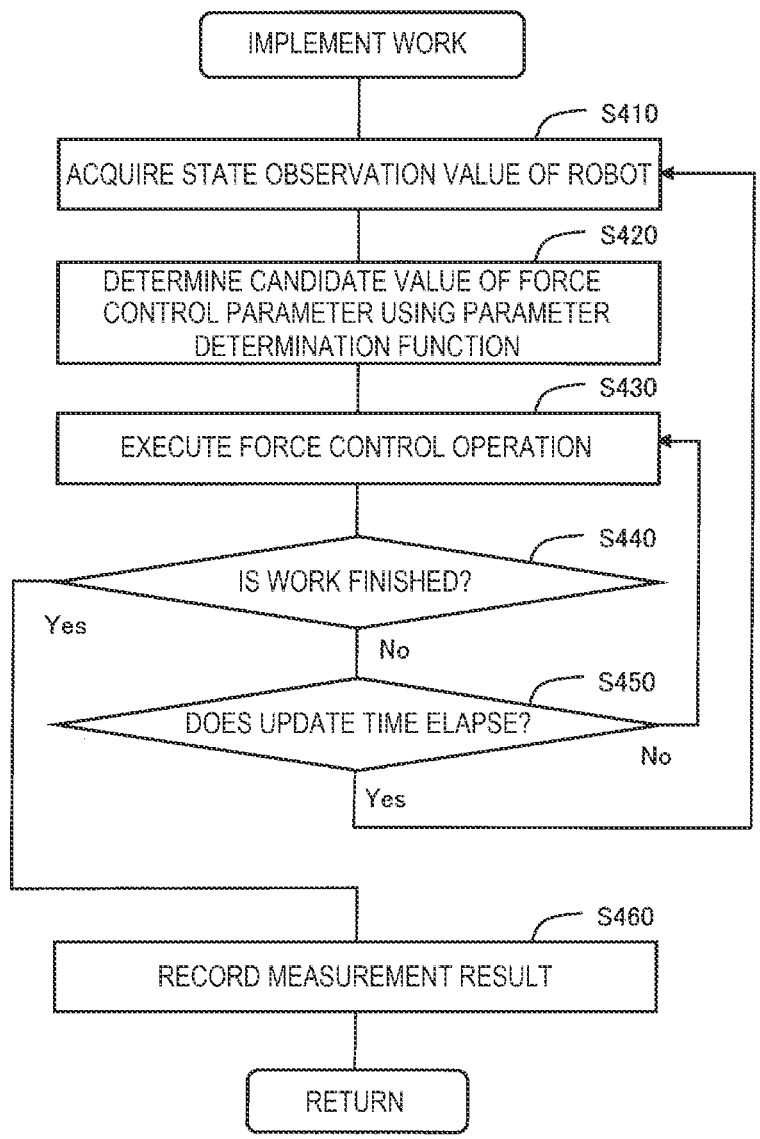
FIG. 10 is a flowchart showing a detailed procedure of implementation of work in the second embodiment.

FIG. 10 is a flowchart showing a detailed procedure of implementation of work at step S245. At step S410, the parameter search unit 314 acquires a state observation value of the robot 100. The state observation value of the robot 100 is a value as input of the parameter determination function PF shown in FIG. 8. The state observation value is acquired by observation of the state of the robot 100 using sensors including the force sensor 140 and the arm encoder 122. At step S420, the parameter search unit 314 determines the candidate value of the force control parameter using the parameter determination function PF. In this regard, the state observation value acquired at step S410 is used as the input of the parameter determination function PF. The internal parameter W of the parameter determination function PF is set at step S235 in FIG. 9.

At step S430, the operation execution unit 312 executes work including force control operation. This work is continued until the work is determined as being finished at step S440. When the work is not finished, the process goes to step S450, which will be described later. On the other hand, when the work is finished, the process goes to step S460 and a measurement result containing the measurement values of the sensors and the takt time of the work is recorded.

At step S450, the parameter search unit 314 determines whether or not a preset update time elapses. "Update time" refers to a time suitable for updating of the candidate value of the force control parameter. When the update time does not elapse, the work at step S440 is continued. On the other hand, when the update time elapses, the process returns to step S410 and the processing at the above described step S410 and subsequent steps is executed again.

As a determination criterion at step S450, generally, a determination criterion whether or not a preset update condition is fulfilled may be used. In this regard, in the middle of single work, steps S410 to S430 are repeated at each time when the update condition is fulfilled. As the update condition at step S450, a fixed update time may be used as shown in FIG. 10, or a condition whether or not a single work portion as part of the work is finished may be used instead. For example, when the entire work contains a work portion using force control and a work portion not using the force control, whether or not those individual work portions are finished may be used as the determination criterion at step S450. For example, regarding the work to fit the first workpiece W1 in the second workpiece W2 in FIG. 1, whether or not the following five work portions are respectively finished may be used as determination criteria:

(1) Move the end effector 150 to above the first workpiece W1, and then, move the end effector downward to the position of the first workpiece W1.
(2) Grip the first workpiece W1 by the end effector 150.
(3) Move the gripped first workpiece W1 to above the second workpiece W2, and then, move the first workpiece downward to immediately above the second workpiece W2.
(4) Fit the first workpiece W1 in the second workpiece W2.
(5) Release the first workpiece W1 and move the end effector 150 to above.

As described above, when the candidate value of the force control parameter is updated with respect to each different work portion, as the state observation value acquired at step S410, of the history of the state observation values in the past trials of the work portions, the state observation value at a specific time may be used. For example, in the past trial in which the optimal value of the force control parameter is obtained with respect to the work portions executed next at step S430, the state observation value at the time when the maximum resultant force $f_{peak}$ is obtained may be acquired from the memory 320 at step S410. In this manner, the candidate value of the force control parameter may be determined by the parameter determination function PF using the state observation value suitable for the work portion. Note that, when step S410 is first executed, a predetermined initial value is used as the state observation value.

Note that step S450 may be omitted and, when the work is determined as being not finished at step S440, the process may be returned to step S430. In this case, the candidate value of the force control parameter is maintained at the same value through the entire work. Further, in this case, as the state observation value at step S410, of the history of the state observation values in the past trials of the work, the state observation value at a specific time may be used. For example, in the past trial of the work in which the optimal value of the force control parameter is obtained, the state observation value at the time when the maximum resultant force $f_{peak}$ is obtained may be acquired from the memory 320 at step S410. Note that, when step S410 is first executed, a predetermined initial value is used as the state observation value.

The work is finished in the above described manner, and then, at step S460, a measurement result containing the measurement values of the sensors and the takt time of the work is recorded. Note that, when the candidate value of the force control parameter is updated in the middle of the work, the history of the candidate values of the force control parameter is also recorded. In this regard, the history of the state observation values may be recorded.

The processing at step S250 in FIG. 9 is the same as that of the first embodiment, and the parameter search unit 314 calculates a value of the objective function in the optimization processing from the measurement result obtained during the work. At step S265, the parameter search unit 314 confirms the optimal values of the force control parameter and the internal parameter according to the value of the objective function y. That is, when the value of the objective function y is the minimum value of the previous values, this candidate value is updated as a new optimal value. On the other hand, when the value of the objective function y is not the minimum value of the previous values, the previous optimal value is maintained without change. The processing at step S270 and the subsequent steps is the same as that of the first embodiment and the explanation thereof will be omitted.

As described above, in the second embodiment, the candidate value of the internal parameter W of the parameter determination function PF is searched for according to the optimization algorithm using the objective function y. Further, the state of the robot 100 is observed during the implementation of the work and the state observation value is input to the parameter determination function PF and the candidate value of the force control parameter is obtained, and the force control operation is executed using the force control parameter. As a result, the force control parameter may be adaptively determined according to the state of the robot 100, and an appropriate force control parameter can be used with respect to each stage of the work.

Also, in the second embodiment, like the first embodiment, the objective function in the form in which the penalty increasing according to the exceedance of the specific force control characteristic value from the allowable value is added to the actual measurement value of the evaluation item is used, and the force control parameter may be optimized while the possibility that the value is larger than the limit value as the constraint condition may be reduced. Further, even when the force sensor has output variations, the possibility that the force control characteristic value is larger than the limit value as the constraint condition may be reduced.

Other Embodiments

The present disclosure is not limited to the above described embodiments, but may be realized in various aspects without departing from the scope thereof. For example, the present disclosure can be realized in the following aspects. The technical features in the above described embodiments corresponding to the technical features in the following respective aspects can be appropriately replaced or combined for solving part or all of the problems of the present disclosure or achieving part or all of the effects of the present disclosure. The technical features not described as essential features in this specification can be appropriately deleted.

(1) According to a first aspect of the present disclosure, a method of setting a force control parameter in work of a robot is provided. The method includes (a) setting a limit value specifying a constraint condition with respect to a specific force control characteristic value detected in force control and an objective function with respect to a specific evaluation item relating to the work, (b) searching for an optimal value of the force control parameter using the objective function, and (c) determining a setting value of the force control parameter according to a result of the searching. The objective function has a form in which a penalty increasing according to an exceedance of the force control characteristic value from an allowable value smaller than the limit value is added to an actual measurement value of the evaluation item.

According to the method, as the objective function used for optimization of the force control parameter, the objective function in the form in which the penalty increasing according to the exceedance of the force control characteristic value from the allowable value is added to the actual measurement value of the evaluation item is used, and the force control parameter may be optimized while the possibility that the value is larger than the limit value as the constraint condition may be reduced. Further, even when the force sensor has output variations, the possibility that the force control characteristic value is larger than the limit value as the constraint condition may be reduced.

(2) In the above described method, when the force control characteristic value is larger than the limit value, the penalty of the objective function may contain a first penalty component obtained by multiplication of the exceedance of the force control characteristic value from the allowable value by a first increase rate and a second penalty component obtained by multiplication of an exceedance of the force control characteristic value from the limit value by a second increase rate.

According to the method, the larger penalty is given to the exceedance from the limit value, and thereby, the possibility that value is larger than the limit value at optimization may be reduced.

(3) In the above described method, (b) may include (b1) trying the work by the robot at a plurality of times with the value of the force control parameter maintained and measuring the force control characteristic value at the respective trials, (b2) updating the objective function according to measurement values of the force control characteristic values in the plurality of trials, and (b3) executing the searching of the optimal value using the updated objective function, and (b2) may include obtaining a standard deviation of the force control characteristic values in the plurality of trials, and updating the allowable value to equalize a difference between the allowable value and the limit value to a difference value having a positive correlation with the standard deviation.

According to the method, an appropriate allowable value may be set according to the variation of the force control characteristic value.

(4) In the above described method, (b2) may further include obtaining an average value of the force control characteristic values in the plurality of trials, and increasing the first increase rate when the average value is larger by a first determination value or more than the allowable value, and decreasing the first increase rate when the average value is smaller by a second determination value or more than the allowable value.

According to the method, the first increase rate may be adjusted so that the force control characteristic value measured during the work may fall within a range close to the allowable value.

(5) In the above described method, (b2) may further include obtaining an excess rate as a rate of the trials at which the force control characteristic value is larger than the limit value of the plurality of trials, and increasing the second increase rate when the excess rate is equal to or larger than a first determination rate and decreasing the second increase rate when the excess rate is equal to or smaller than a second determination rate smaller than the first determination rate.

According to the method, the possibility that the force control characteristic value measured during the work is larger than the limit value may be reduced.

(6) In the above described method, (b) may include (i) searching for a candidate value of an internal parameter of a parameter determination function to which a state observation value showing a state of the robot is input and from which the force control parameter is output according to an optimization algorithm using the objective function, (ii) setting the candidate value of the internal parameter obtained at (i) in the parameter determination function, (iii) acquiring the state observation value, (iv) obtaining a candidate value of the force control parameter by inputting the state observation value to the parameter determination function, (v) acquiring a measurement result containing the force control characteristic value and the evaluation item by executing the work of the robot using the candidate value of the force control parameter, (vi) calculating a value of the objective function from the measurement result, and (vii) repeating (i) to (vi) until a search end condition is fulfilled.

According to the method, the force control parameter may be adaptively determined according to the state of the robot.

(7) In the above described method, (iii) to (v) may be repeated at each time when a preset update condition is fulfilled in a middle of the single work.

According to the method, a different force control parameter may be used at each time when the update condition is fulfilled, and an appropriate force control parameter can be used with respect to each stage of the work.

(8) In the above described method, the evaluation item may be a takt time of the work, the force control characteristic value may contain at least one of a maximum value of a resultant force and a maximum value of resultant moment applied to a workpiece as an object of the work from the robot, and the force control parameter may contain at least one of a virtual mass coefficient, a virtual viscosity coefficient, and a virtual elastic coefficient.

According to the method, optimization with respect to at least one of the virtual mass coefficient, the virtual viscosity coefficient, and the virtual elastic coefficient may be executed using the objective function in the form in which the penalty according to the maximum value of the resultant force or the resultant moment is added to the actual measurement value of the takt time.

(9) According to a second aspect of the present disclosure, a robot system is provided. The robot system includes a robot, a sensor detecting a specific force control characteristic value in work of the robot by force control, and a parameter setting section executing processing of setting a force control parameter of the robot. The parameter setting section executes (a) processing of setting a limit value specifying a constraint condition with respect to the force control characteristic value and an objective function with respect to a specific evaluation item relating to the work, (b) processing of searching for an optimal value of the force control parameter using the objective function, and (c) processing of determining a setting value of the force control parameter according to a result of the searching. The objective function has a form in which a penalty increasing according to an exceedance of the force control characteristic value from an allowable value smaller than the limit value is added to an actual measurement value of the evaluation item.

(10) According to a third aspect of the present disclosure, a non-transitory computer-readable storage medium storing a computer program controlling a processor to execute processing of setting a force control parameter in work of a robot is provided. The computer program controls the processor to execute (a) processing of setting a limit value specifying a constraint condition with respect to a specific force control characteristic value detected in force control and an objective function with respect to a specific evaluation item relating to the work, (b) processing of searching for an optimal value of the force control parameter using the objective function, and (c) processing of determining a setting value of the force control parameter according to a result of the searching. The objective function has a form in which a penalty increasing according to an exceedance of the force control characteristic value from an allowable value smaller than the limit value is added to an actual measurement value of the evaluation item.

The present disclosure can be realized in various other aspects than those described above. For example, the present disclosure may be realized in aspects such as a robot system including a robot and a robot control apparatus, a computer program for realizing functions of the robot control apparatus, and a non-transitory storage medium recording the computer program.

What is claimed is:

1. A method of setting a force control parameter in work of a robot, comprising:
    (a) setting a limit value specifying a constraint condition with respect to a specific force control characteristic value detected in force control and an objective function with respect to a specific evaluation item relating to the work;
    (b) searching for an optimal value of the force control parameter using the objective function; and
    (c) determining a setting value of the force control parameter according to a result of the searching, wherein
    the objective function has a form in which a penalty increasing according to an exceedance of the force control characteristic value from an allowable value smaller than the limit value is added to an actual measurement value of the evaluation item, and
    when the force control characteristic value is larger than the limit value, the penalty of the objective function contains a first penalty component obtained by multiplication of the exceedance of the force control characteristic value from the allowable value by a first increase rate and a second penalty component obtained by multiplication of an exceedance of the force control characteristic value from the limit value by a second increase rate.

2. The method according to claim 1, wherein
(b) includes:
   (b1) trying the work by the robot at a plurality of times with the value of the force control parameter maintained and measuring the force control characteristic value at the respective trials;
   (b2) updating the objective function according to measurement values of the force control characteristic values in the plurality of trials; and
   (b3) executing the searching of the optimal value using the updated objective function, and
(b2) includes
    obtaining a standard deviation of the force control characteristic values in the plurality of trials, and
    updating the allowable value to equalize a difference between the allowable value and the limit value to a difference value having a positive correlation with the standard deviation.

3. The method according to claim 2, wherein
(b2) further includes:
    obtaining an average value of the force control characteristic values in the plurality of trials; and
    increasing the first increase rate when the average value is larger by a first determination value or more than the allowable value, and decreasing the first increase rate when the average value is smaller by a second determination value or more than the allowable value.

4. The method according to claim 2, wherein
(b2) further includes:
    obtaining an excess rate as a rate of the trials at which the force control characteristic value is larger than the limit value of the plurality of trials; and
    increasing the second increase rate when the excess rate is equal to or larger than a first determination rate and decreasing the second increase rate when the excess rate is equal to or smaller than a second determination rate smaller than the first determination rate.

5. The method according to claim 1, wherein
(b) includes:
    (i) searching for a candidate value of an internal parameter of a parameter determination function to which a state observation value showing a state of the robot is input and from which the force control parameter is output according to an optimization algorithm using the objective function;
    (ii) setting the candidate value of the internal parameter obtained at (i) in the parameter determination function;
    (iii) acquiring the state observation value;
    (iv) obtaining a candidate value of the force control parameter by inputting the state observation value to the parameter determination function;
    (v) acquiring a measurement result containing the force control characteristic value and the evaluation item by executing the work of the robot using the candidate value of the force control parameter;
    (vi) calculating a value of the objective function from the measurement result; and
    (vii) repeating (i) to (vi) until a search end condition is fulfilled.

6. The method according to claim 5, wherein
the work is performed by the robot at a plurality of times, and (iii) to (v) are repeated at each time when a preset update condition is fulfilled in a middle of the work during one time of the plurality of times.

7. The method according to claim 1, wherein
the evaluation item is a takt time of the work,
the force control characteristic value contains at least one of a maximum value of a resultant force and a maximum value of resultant moment applied to a workpiece as an object of the work from the robot, and
the force control parameter contains at least one of a virtual mass coefficient, a virtual viscosity coefficient, and a virtual elastic coefficient.

8. A robot system comprising:
a robot;
a sensor detecting a specific force control characteristic value in work of the robot by force control;
a memory configured to store a program; and
a processor configured to execute the program so as to perform:
   (a) processing of setting a limit value specifying a constraint condition with respect to the force control characteristic value and an objective function with respect to a specific evaluation item relating to the work;
   (b) processing of searching for an optimal value of the force control parameter using the objective function; and
   (c) processing of determining a setting value of the force control parameter according to a result of the searching, wherein
the objective function has a form in which a penalty increasing according to an exceedance of the force control characteristic value from an allowable value smaller than the limit value is added to an actual measurement value of the evaluation item, and
when the force control characteristic value is larger than the limit value, the penalty of the objective function contains a first penalty component obtained by multiplication of the exceedance of the force control characteristic value from the allowable value by a first increase rate and a second penalty component obtained by multiplication of an exceedance of the force control characteristic value from the limit value by a second increase rate.

9. A non-transitory computer-readable storage medium storing a computer program controlling a processor to execute processing of setting a force control parameter in work of a robot controlling the processor to execute:
   (a) processing of setting a limit value specifying a constraint condition with respect to a specific force control characteristic value detected in force control and an objective function with respect to a specific evaluation item relating to the work;
   (b) processing of searching for an optimal value of the force control parameter using the objective function; and
   (c) processing of determining a setting value of the force control parameter according to a result of the searching, wherein
the objective function has a form in which a penalty increasing according to an exceedance of the force control characteristic value from an allowable value smaller than the limit value is added to an actual measurement value of the evaluation item, and
when the force control characteristic value is larger than the limit value, the penalty of the objective function contains a first penalty component obtained by multiplication of the exceedance of the force control characteristic value from the allowable value by a first increase rate and a second penalty component obtained by multiplication of an exceedance of the force control characteristic value from the limit value by a second increase rate.

* * * * *